United States Patent
Kuo et al.

(10) Patent No.: US 7,748,044 B2
(45) Date of Patent: Jun. 29, 2010

(54) SYSTEM AND METHOD FOR PROCESSING DRM-ENABLED FILES

(75) Inventors: Lung-Yi Kuo, Taichung Hsien (TW); Shin-Ping Lin, Jhubei (TW); Chun-Ching Huang, Jhubei (TW)

(73) Assignee: Siliconmotion Inc., Hsinchu County (TW)

( * ) Notice: Subject to any disclaimer, the term of this patent is extended or adjusted under 35 U.S.C. 154(b) by 984 days.

(21) Appl. No.: 11/502,463

(22) Filed: Aug. 11, 2006

(65) Prior Publication Data

US 2007/0162977 A1    Jul. 12, 2007

(30) Foreign Application Priority Data

Jan. 9, 2006    (TW) ............................... 95100802 A

(51) Int. Cl.
G06F 17/30 (2006.01)
G06F 21/00 (2006.01)
(52) U.S. Cl. ............................... 726/26; 705/57; 705/59
(58) Field of Classification Search .................. 726/26; 705/57, 59
See application file for complete search history.

(56) References Cited

U.S. PATENT DOCUMENTS

| | | | |
|---|---|---|---|
| 2002/0013772 A1* | 1/2002 | Peinado | 705/51 |
| 2002/0194355 A1* | 12/2002 | Morita et al. | 709/231 |
| 2002/0194356 A1* | 12/2002 | Chan et al. | 709/231 |
| 2003/0069854 A1* | 4/2003 | Hsu et al. | 705/59 |
| 2005/0132208 A1* | 6/2005 | Hug et al. | 713/189 |
| 2005/0216763 A1 | 9/2005 | Lee et al. | |
| 2006/0026691 A1* | 2/2006 | Kim et al. | 726/27 |
| 2006/0083369 A1* | 4/2006 | Lee | 380/28 |
| 2006/0235801 A1* | 10/2006 | Strom et al. | 705/59 |

FOREIGN PATENT DOCUMENTS

| | | |
|---|---|---|
| CA | 2560477 | 6/2005 |
| MX | PA04009658 A | 6/2005 |
| TW | 220620 | 8/2004 |
| TW | 234979 | 6/2005 |
| TW | 242704 | 11/2005 |
| TW | 243570 | 11/2005 |
| TW | 244313 | 11/2005 |

* cited by examiner

Primary Examiner—Minh Dieu Nguyen
(74) Attorney, Agent, or Firm—Muncy, Geissler, Olds & Lowe, PLLC

(57) ABSTRACT

A system for processing DRM-enabled files includes a playback device and a software module. The software module includes a license-downloading module, a license-transforming module, a decryption module and an encryption module. The license-downloading module is configured to download a first license from a license server to a computer. The license-transforming module is configured to convert the first license to a second license. The decryption module is configured to decrypt a first DRM-enabled file of the computer into a raw file with a first decryption key. The encryption module is configured to encrypt the raw file into a second DRM-enabled file with a second encryption key. The playback device is configured to decrypt the second DRM-enabled file with the second license. The method of the system is also provided.

16 Claims, 3 Drawing Sheets

SYSTEM AND METHOD FOR PROCESSING DRM-ENABLED FILES

RELATED APPLICATIONS

The present application is based on, and claims priority from, Taiwan Application Serial Number 95100802, filed Jan. 9, 2006, the disclosure of which is hereby incorporated by reference herein in its entirety.

BACKGROUND

1. Field of Invention

The present invention relates to a system and a method for processing computer files, and more particularly, to a system and a method for processing DRM-enabled files.

2. Description of Related Art

In recent years, people are paying much more attention to intellectual property. Hence, digital rights management (DRM) is highly desirable in connection with digital content such as music, images, videos and electronic books, where such digital content is distributed to users. However DRM formats vary according to software vendors and equipment manufacturers. For example, DRM formats of digital music files such as Windows Media Audio format files, Advanced Audio Coding format files and Real Audio format files are various and have their own playback devices. Therefore, users have to buy several playback devices to play different kinds of DRM-enabled music files.

To overcome this problem, a conventional portable Mp3 player is designed to support multiple kinds of DRM-enabled music files. However, the conventional device is complicated, costly and has the limited extensibility for new DRM formats.

Accordingly, providing a system and a method to enable a playback device to support different kinds of the DRM-enabled files without increasing the cost is an issue of great consequence.

SUMMARY

The present invention provides a system and a method for processing DRM-enabled files, which can utilize a playback device to support different kinds of the DRM-enabled files via a software module, thereby reducing the cost compared to conventional systems.

It is another aspect of the present invention to provide a system and a method for processing DRM-enabled files, which utilizes an extensible software module to convert different kinds of the DRM-enabled files, in order to obtain good extensibility.

It is still another aspect of the present invention to provide a system and a method for processing DRM-enabled files, which converts different kinds of DRM-enabled files into a specific format. Thus, the playback devices can be simplified since the playback devices only have to support the specific DRM format.

Accordingly, the present invention provides a system for processing DRM-enabled files. The system includes a playback device and a software module. The software module includes a license-downloading module, a license-transforming module, a decryption module and an encryption module. The license-downloading module is configured to download a first license from a license server to a computer. The first license includes a first decryption key and metering information. The license-transforming module is configured to convert the first license to a second license. The second license has a second decryption key and metering information. The decryption module is configured to decrypt a first DRM-enabled file of the computer into a raw file with the first decryption key. The encryption module is configured to encrypt the raw file into a second DRM-enabled file with a second encryption key. The second encryption key and the second decryption key are key pairs. The playback device is configured to decrypt the second DRM-enabled file with the second license.

According to preferred embodiments, the computer has a virtual-device driver and a standard DRM application. The software module has a virtual-device control module. The virtual-device control module is configured to communicate with the standard DRM application through the virtual-device driver.

According to preferred embodiments, the standard DRM application is a Windows Media Player application, a Real Player application or an i-TUNEs application.

According to preferred embodiments, the software module communicates with the playback device using a Media Transfer Protocol According to preferred embodiments, the first DRM-enabled file is a music file, an image file, a video file or an electronic book file.

According to preferred embodiments, the raw file is stored temporarily in a memory of the computer.

The present invention also provides a method for processing DRM-enabled files. The method is implemented in a computer. The method includes the following steps. The computer is coupled to a license server according to a first DRM-enabled file firstly. The first DRM-enabled file is encrypted with a first encryption key. Next, the computer transmits a device key of a playback device to the license server. Next, the computer downloads a first license from the license server. The first license includes a first decryption key and metering information. The first encryption key and the first decryption key are key pairs. The first license is generated using the device key. Next, the computer decrypts the first DRM-enabled file with the first decryption key to convert the first DRM-enabled file into a raw file. Next, the computer generates a second encryption key and a second decryption key. The second encryption key and the second decryption key are key pairs. Next, the computer generates a second license. The second license includes the metering information and the second decryption key. Next, the computer encrypts the raw file with the second encryption key to create a second DRM-enabled file. Next, the computer transmits the second DRM-enabled file and the second license to the playback device.

According to preferred embodiments, further includes the act of downloading the first DRM-enabled file to the computer.

According to preferred embodiments, further includes the act of deleting the raw file.

According to preferred embodiments, the first DRM-enabled file is a Windows Media Audio format file, an Advanced Audio Coding format file or a Real Audio format file.

It is to be understood that both the foregoing general description and the following detailed description are by examples and are intended to provide further explanations of the invention as claimed.

BRIEF DESCRIPTION OF THE DRAWINGS

These and other features, aspects and advantages of the invention will become apparent by reference to the following description and accompanying drawings, which are given by way of illustration only, and thus are not limitative of the invention, wherein.

DESCRIPTION OF THE PREFERRED EMBODIMENTS

Figure 1:
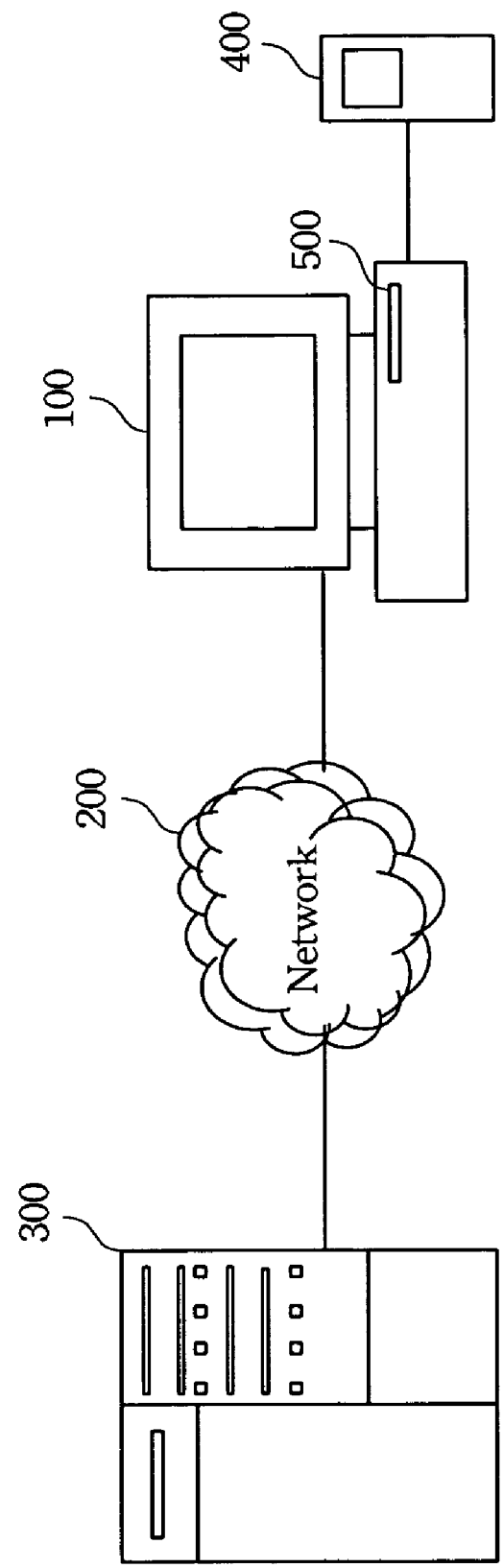
FIG. 1 is an illustration showing a computing system environment suitable for use in implementing the present invention.

FIG. 1 is an illustration showing a computing system environment suitable for implementing the present invention. A client computer 100 is coupled with a license server 300 over a network 200 and a playback device 400 is coupled with the client computer 100, so that the client computer 100, the license server 300 and the playback device 400 can communicate with each other. The client computer 100 executes a software module stored in a computer-readable medium 500 to download a license from the license server 300 and decrypt a first DRM-enabled file into a raw file. Subsequently, the client computer 100 encrypts the raw file into a second DRM-enabled file supported by the playback device 400. In this way, the playback device 400 can support different kinds of DRM-enabled files via the software module and users can use different kinds of DRM-enabled files with the playback device 400. Moreover, the playback device 400 can support a new DRM format by upgrading the software module.

More specifically, the client computer 100 has an operating system that may be selected from well-known operating systems such as Microsoft Windows, LINUX, UNIX and MAC OS, which contain network functions. The client computer 100 can be coupled with the Internet via an Internet Service Provider (ISP). The playback device 400 such as a portable MP3 player can be coupled with the client computer 100 through a Universal Serial Bus (USB) interface. The computer-readable medium 500 can be a hard disk, a floppy disk, a compact disk or a memory. A software module stored in the computer-readable medium 500 can convert different kinds of DRM-enabled file into the specific format that the playback device 400 supports. Thus, the playback device 400 can be simplified and the cost thereof can be reduced since the playback device 400 only has to support the specific DRM format.

Figure 2:
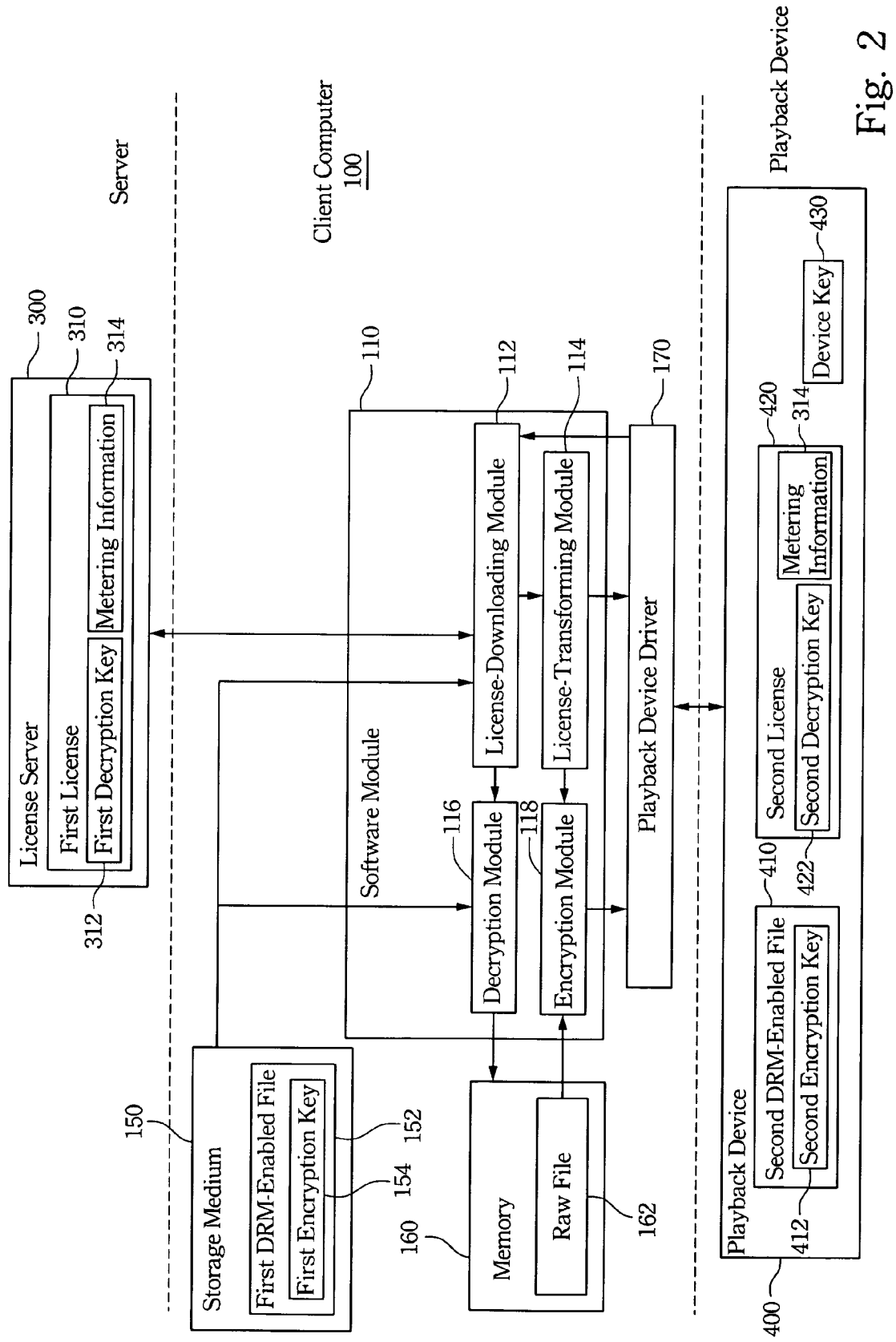
FIG. 2 is a block diagram of a preferred embodiment of the present invention that uses Windows Media DRM technology.

FIG. 2 is a block diagram of a preferred embodiment of the present invention developed using the Windows Media DRM technology. Referring to FIG. 2, the first DRM-enabled file 152 can be, for example, a digital music file saved in Windows Media Audio format. A software module 110 for converting the first DRM-enabled file 152 can be developed using the Windows Media Rights Manager Software Development Kit. The playback device 400 for playing the first DRM-enabled file 152 supports the Windows Media Portable Device DRM (PDDRM).

The first DRM-enabled file 152 encrypted with the first encryption key 154 is downloaded to the client computer 100 via a network. The first DRM-enabled file 152 is stored in a storage medium 150 such as a hard disk, a floppy disk, a compact disk or a memory. The software module 110 includes a license-downloading module 112, a license-transforming module 114, a decryption module 116 and an encryption module 118. The playback device 400 has a unique device key 430. The client computer 100 communicates with the playback device 400 via a playback device driver 170.

As will be discussed below, the software module 110 can convert different kinds of DRM-enabled files into a specific format. With continued reference to FIG. 2, the license-downloading module 112 connects to the license server 300 by reading the content of the first DRM-enabled file 152. For example, an IP address of the license server 300 can be stored in the first DRM-enabled file 152. The license-downloading module 112 acquires the IP address and connects to the license server 300 according to the IP address. Next, the license-downloading module 112 acquires the unique device key 430 from the playback device 400 and transmits the device key 430 to the license server 300. The license server 300 generates a first license 310 with the device key 430 and the first license 310 can be utilized to decrypt and play the first DRM-enabled file 152. The first license 310 includes a first decryption key 312 and metering information 314. The metering information 314 includes a license duration limits or a specified number of times the first DRM-enabled file 152 can be played back. The first encryption key 154 and the first decryption key 312 are key pairs.

Next, the license-downloading module 112 downloads the first license 310 and transmits the first license 310 to the license-transforming module 114 and the decryption module 116. The decryption module 116 decrypts the first DRM-enabled file 152 with the first decryption key 312 to generate a raw file 162 and temporarily stores the raw file 162 in the memory 160 of the client computer 100.

Next, the license-transforming module 114 generates key pairs including a second encryption key 412 and a second decryption key 422. The license-transforming module 114 generates a second license 420 with the metering information 314 and the second decryption key 422. In other words, the license-transforming module 114 converts the first license 310 into the second license 420. The first license 310 and the second license 420 have the same metering information 314. Next, the license-transforming module 114 transmits the second encryption key 412 to the encryption module 118. The encryption module 118 generates the second DRM-enabled file 410 by encrypting the raw file 162 with the second encryption key 412. It should be noted that the raw file 162 is stored temporarily in the memory 160 when the first DRM-enabled file 152 is converted into the second DRM-enabled file 410 and the raw file 162 is thrown away when the conversion is completed.

The encryption module 118 transmits the second DRM-enabled file 410 to the playback device 400 and the license-transforming module 114 transmits the second license 420 to the playback device 400, so that the playback device 400 can decrypt second DRM-enabled file 410 with the second license 420 and plays the second DRM-enabled file 410 according to the metering information 314. The playback device 400 can be specially designed to decrypt the format of the second DRM-enabled file 410. Thus, the efficiency of decrypting, power consumption and cost of production of the playback device 400 can be improved. Moreover, the playback device 400 can be coupled with the client computer 100 through a USB interface and communicates with the client computer 100 via the Media Transfer Protocol that can improve the performance and compatibility of the playback device 400. In this way, the playback device 400 can be a mass storage device of the client computer 100.

Figure 3:
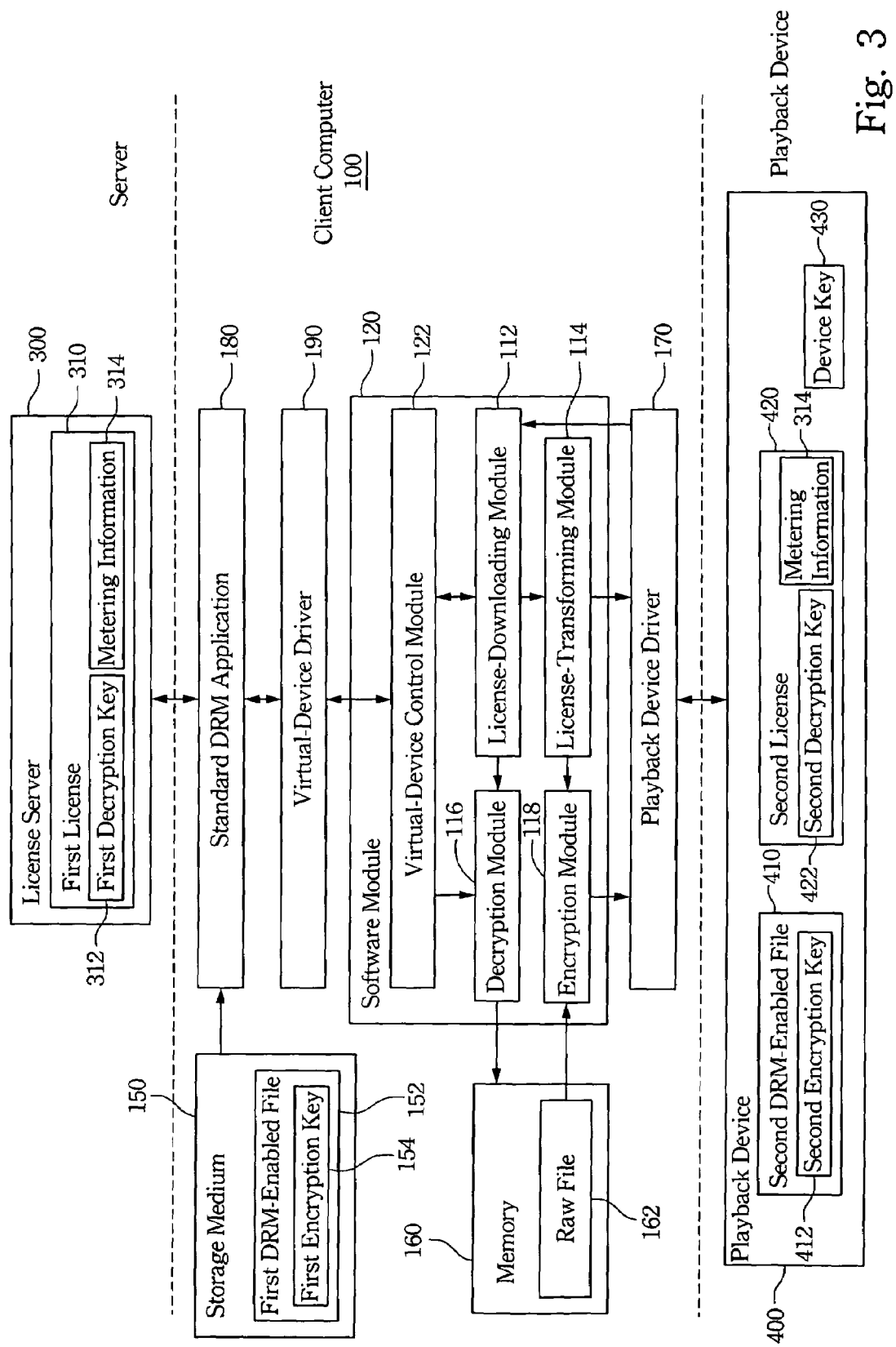
FIG. 3 is a block diagram of another preferred embodiment of the present invention.

FIG. 3 is a block diagram of another preferred embodiment of the present invention. The client computer 100 has a virtual-device driver 190 and a standard DRM application 180. The software module 120 has a virtual-device control module 122. The standard DRM application 180 can be, for example, the Windows Media Player. The first DRM-enabled file 152 and the first license 310 can be downloaded to the client computer 100 via the standard DRM application 180. The virtual-device control module 122 can communicate with the standard DRM application 180 via the virtual-device driver 190. In this way, the software module 120 can be developed without the Windows Media Rights Manager Software Development Kit.

With continued reference to FIG. 3, the standard DRM application 180 can be a Real Player application and the first DRM-enabled file 152 can be a Real Audio format file. Also, the standard DRM application 180 can be an i-TUNES application and the first DRM-enabled file 152 can be an Advanced Audio Coding format file. In brief, the software module 120 can support different kinds of the DRM-enabled files 152 by choosing a suitable standard DRM application 180 and appending functions to the virtual-device control module 122.

In accordance with an embodiment of the present invention disclosed herein, the DRM-enabled file 152 can be a digital music file. It should be noted that the present invention is not intended to be limited to the embodiment. Of course, the DRM-enabled file 152 can be an image file, a video file or an electronic book file also.

According to preferred embodiments mentioned above, the system and the method for processing DRM-enabled files of the present invention have the following advantages. Firstly, the playback device can support different kinds of DRM-enabled files via the software module of the present invention, thus obtaining a good extensibility. Secondly, the playback device only has to support the specific DRM format, such that users can use many kinds of DRM-enabled files with the same playback device. Thirdly, the playback device can be specially designed for decrypting the specific format of the DRM-enabled files. Thus, the efficiency of decrypting, power consumption and cost of production of the playback device can be improved.

While the invention has been described by way of example and in terms of the preferred embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for processing DRM-enabled files, implemented in a computer, the method comprising:
   coupling a license server according to a first DRM-enabled file, wherein the first DRM-enabled file is encrypted with a first encryption key;
   transmitting a device key of a playback device to the license server;
   downloading a first license from the license server after the license server generating the first license, the first license including a first decryption key and metering information, wherein the first encryption key and the first decryption key are key pairs and the first license is generated using the device key;
   decrypting the first DRM-enabled file with the first decryption key to convert the first DRM-enabled file into a raw file;
   generating a second encryption key and a second decryption key, wherein the second encryption key and the second decryption key are key pairs;
   generating a second license, the second license including the metering information and the second decryption key;
   encrypting the raw file with the second encryption key to create a second DRM-enabled file for being decrypted by the playback device; and
   transmitting the second DRM-enabled file and the second license to the playback device.

2. A method as recited in claim 1, further comprising the act of downloading the first DRM-enabled file to the computer.

3. A method as recited in claim 1, further comprising the act of deleting the raw file.

4. A method as recited in claim 1, wherein the first DRM-enabled file is a music file, an image file, a video file or an electronic book file.

5. A method as recited in claim 1, wherein the first DRM-enabled file is a Windows Media Audio format file, an Advanced Audio Coding format file or a Real Audio format file.

6. A computer-readable medium storing a software module, the software module comprising:
   a license-downloading module, configured to couple a license server according to a first DRM-enabled file, and download a first license from the license server to a computer based on a device key of a playback device, the first license including a first decryption key and a metering information;
   a license-transforming module, configured to generate key pairs including a second encryption key and a second decryption key, and convert the first license to a second license with the second decryption key, the second license having the second decryption key and the metering information;
   a decryption module, configured to decrypt the first DRM-enabled file of the computer into a raw file with the first decryption key; and
   an encryption module, configured to encrypt the raw file into a second DRM-enabled file with the second encryption key.

7. A computer-readable medium as recited in claim 6, wherein the raw file is storied in the computer memory.

8. A computer-readable mediums as recited in claim 6, wherein the first DRM-enabled file is a music file, an image file, a video file or an electronic book file.

9. A computer-readable medium as recited in claim 6, wherein the first DRM-enabled file is a Windows Media Audio format file, an Advanced Audio Coding format file or a Real Audio format file.

10. A computer-readable medium as recited in claim 6, wherein the computer has a virtual-device driver and a standard DRM application, the software module having a virtual-device control module, the virtual-device control module configured to communicate with the standard DRM application through the virtual-device driver.

11. A computer-readable medium as recited in claim 10, wherein the standard DRM application is a Windows Media Player application, a Real Player application or an i-TUNES application.

12. A system for processing DRM-enabled files comprising:
   a playback device; and
   a software module comprising:
      a license-downloading module, configured to couple a license server according to a first DRM-enabled file, and download a first license from the license server to a computer based on a device key of a playback device, the first license including a first decryption key and metering information;
      a license-transforming module, configured to generate key pairs including a second encryption key and a second decryption key in the computer, and convert the first license to a second license with the second decryption key, the second license having the second decryption key and the metering information;

a decryption module, configured to decrypt the first DRM-enabled file of the computer into a raw file with the first decryption key; and an encryption module, configured to encrypt the raw file into a second DRM-enabled file with the second encryption key;

wherein the playback device is configured to decrypt the second DRM-enabled file with the second license.

13. A system as recited in claim 12, wherein the computer has a virtual-device driver and a standard DRM application, the software module having a virtual-device control module, the virtual-device control module configured to communicate with the standard DRM application through the virtual-device driver.

14. A system as recited in claim 13, wherein the standard DRM application is a Windows Media Player application, a Real Player application or an i-TUNES application.

15. A system as recited in claim 12, wherein the software module communicates with the playback device using a Media Transfer Protocol.

16. A system as recited in claim 12, wherein the first DRM-enabled file is a music file, an image file, a video file or an electronic book file.

* * * * *